United States Patent
Subedi et al.

(10) Patent No.: US 11,367,049 B2
(45) Date of Patent: Jun. 21, 2022

(54) METHOD AND SYSTEM FOR IDENTIFYING EMAILS AND CALENDAR EVENTS ASSOCIATED WITH PROJECTS OF AN ENTERPRISE ENTITY

(71) Applicant: Clari Inc., Sunnyvale, CA (US)

(72) Inventors: Mahesh Subedi, Sunnyvale, CA (US); Venkat Rangan, Sunnyvale, CA (US); Sanjay Kumar Mahalingam, Sunnyvale, CA (US)

(73) Assignee: CLARI INC., Sunnyvale, CA (US)

( * ) Notice: Subject to any disclaimer, the term of this patent is extended or adjusted under 35 U.S.C. 154(b) by 823 days.

(21) Appl. No.: 15/585,124

(22) Filed: May 2, 2017

(65) Prior Publication Data
US 2018/0322461 A1    Nov. 8, 2018

(51) Int. Cl.
G06Q 10/00    (2012.01)
G06Q 10/10    (2012.01)
H04L 51/08    (2022.01)
H04L 51/42    (2022.01)

(52) U.S. Cl.
CPC ......... *G06Q 10/103* (2013.01); *G06Q 10/107* (2013.01); *G06Q 10/1093* (2013.01); *H04L 51/08* (2013.01); *H04L 51/22* (2013.01)

(58) Field of Classification Search
USPC ...................................................... 705/7.18
See application file for complete search history.

(56) References Cited

U.S. PATENT DOCUMENTS

| 6,578,005 | B1 | 6/2003 | Lesaint et al. |
| 7,480,623 | B1 | 1/2009 | Landvater |
| 7,519,173 | B2 | 4/2009 | Flores et al. |
| 7,831,676 | B1 * | 11/2010 | Nagar .................. G06Q 10/107 709/224 |
| 8,005,700 | B2 | 8/2011 | Amitabh et al. |
| 9,239,719 | B1 | 1/2016 | Feinstein et al. |
| 9,298,355 | B1 | 3/2016 | Beausoleil et al. |
| 2002/0010961 | A1 | 1/2002 | Brown |

(Continued)

FOREIGN PATENT DOCUMENTS

WO    0210961 A2    2/2002

OTHER PUBLICATIONS

Turning Email addresses into Asana Tasks, May 2017, Asana, https://asana.com/guide/help/email/email-to-asana, p. 1-4. (Year: 2017).*

*Primary Examiner* — Joseph M Waesco
(74) *Attorney, Agent, or Firm* — Womble Bond Dickinson (US) LLP

(57) ABSTRACT

According to one embodiment, a customer relationship management (CRM) system is queried to obtain a project that is associated with an entity (e.g., a user, a group of users, a client). A first list of one or more contacts (e.g., contact persons, referred to herein target contacts) associated with the project from the CRM system. For each of the contacts in the first list, a domain name is determined based on contact information of the contacts (e.g., emails, Web addresses, name of an account associated with the contacts). A first set of email addresses, referred to as target email addresses, is determined based on the domain name and contacts using a set of email identification rules. An email server is queried to retrieve a list of one or more emails and/or calendar events based on the first set of email addresses.

24 Claims, 11 Drawing Sheets

(56) References Cited

U.S. PATENT DOCUMENTS

| | | | |
|---|---|---|---|
| 2003/0068097 A1 | 4/2003 | Wilson et al. | |
| 2003/0135565 A1 | 7/2003 | Estrada | |
| 2004/0015556 A1 | 1/2004 | Chopra | |
| 2005/0038687 A1 | 2/2005 | Galdes | |
| 2005/0114829 A1 | 5/2005 | Robin et al. | |
| 2005/0209901 A1 | 9/2005 | Miller et al. | |
| 2006/0085220 A1 | 4/2006 | Sherwood et al. | |
| 2006/0168059 A1* | 7/2006 | Chang | G06Q 10/107 709/206 |
| 2007/0016614 A1* | 1/2007 | Novy | G06F 40/154 |
| 2007/0192162 A1 | 8/2007 | Simons et al. | |
| 2007/0250377 A1 | 10/2007 | Hill et al. | |
| 2007/0282658 A1 | 12/2007 | Brintle | |
| 2008/0049022 A1 | 2/2008 | Sherb et al. | |
| 2009/0106691 A1 | 4/2009 | Ballard et al. | |
| 2009/0138301 A1 | 5/2009 | Wan | |
| 2009/0216571 A1 | 8/2009 | Sunshine et al. | |
| 2009/0234686 A1 | 9/2009 | Chakra et al. | |
| 2009/0287532 A1 | 11/2009 | Cohen et al. | |
| 2009/0313121 A1 | 12/2009 | Post et al. | |
| 2010/0057628 A1 | 3/2010 | Trinidad et al. | |
| 2010/0313009 A1 | 12/2010 | Combet et al. | |
| 2011/0010340 A1 | 1/2011 | Hung et al. | |
| 2011/0078250 A1* | 3/2011 | Angell | H04L 49/109 709/206 |
| 2011/0078260 A1* | 3/2011 | Rashad | G06Q 10/107 709/206 |
| 2011/0264483 A1 | 10/2011 | Nezhad et al. | |
| 2012/0046996 A1 | 2/2012 | Shah et al. | |
| 2012/0150888 A1* | 6/2012 | Hyatt | G06F 16/335 707/758 |
| 2012/0173638 A1 | 7/2012 | Vymenets et al. | |
| 2012/0246027 A1 | 9/2012 | Martin | |
| 2013/0080201 A1 | 3/2013 | Miller | |
| 2013/0218640 A1 | 8/2013 | Kidder et al. | |
| 2013/0246119 A1 | 9/2013 | Slaughenhoupt | |
| 2013/0318533 A1 | 11/2013 | Aghassipour et al. | |
| 2013/0318589 A1 | 11/2013 | Ford et al. | |
| 2014/0012616 A1 | 1/2014 | Moshenek | |
| 2014/0129624 A1 | 5/2014 | Liu et al. | |
| 2014/0156757 A1 | 6/2014 | Zhang et al. | |
| 2014/0244351 A1 | 8/2014 | Symons | |
| 2014/0304034 A1 | 10/2014 | Mitchell et al. | |
| 2015/0051957 A1 | 2/2015 | Griebeler et al. | |
| 2015/0121299 A1 | 4/2015 | Snyder et al. | |
| 2015/0153571 A1 | 6/2015 | Ballard et al. | |
| 2015/0178666 A1 | 6/2015 | Green et al. | |
| 2015/0269525 A1* | 9/2015 | Hazy | G06Q 10/103 434/237 |
| 2015/0339628 A1 | 11/2015 | Oh et al. | |
| 2015/0348589 A1 | 12/2015 | Barisano et al. | |
| 2015/0373106 A1* | 12/2015 | Dennis | H04L 51/22 709/219 |
| 2015/0381599 A1* | 12/2015 | Porzio | G06F 21/64 726/3 |
| 2016/0150280 A1 | 5/2016 | Cui et al. | |
| 2016/0155137 A1 | 6/2016 | Harsha et al. | |
| 2016/0224939 A1 | 8/2016 | Chen et al. | |
| 2016/0232465 A1* | 8/2016 | Kurtz | G06Q 10/0635 |
| 2016/0253706 A1 | 9/2016 | Kursar | |
| 2016/0335896 A1 | 11/2016 | Iwamoto | |
| 2017/0083572 A1* | 3/2017 | Tankersley | G06F 16/24573 |
| 2017/0102912 A1 | 4/2017 | Jambulingam et al. | |
| 2017/0272394 A1 | 9/2017 | Ding et al. | |
| 2017/0286978 A1 | 10/2017 | Govindarajan et al. | |
| 2018/0005171 A1 | 1/2018 | Harsha et al. | |
| 2018/0005253 A1 | 1/2018 | Megahed et al. | |
| 2018/0268416 A1* | 9/2018 | Ponnusamy | G06Q 10/063118 |
| 2018/0315062 A1* | 11/2018 | Parekh | G06F 3/0482 |
| 2019/0147545 A1* | 5/2019 | Cerri | G06Q 40/12 705/7.18 |
| 2022/0012690 A1* | 1/2022 | Subedi | G06Q 10/103 |

\* cited by examiner

US 11,367,049 B2

METHOD AND SYSTEM FOR IDENTIFYING EMAILS AND CALENDAR EVENTS ASSOCIATED WITH PROJECTS OF AN ENTERPRISE ENTITY

FIELD OF THE INVENTION

Embodiments of the present invention relate generally to project management. More particularly, embodiments of the invention relate to identifying activities such as emails and calendar events associated with projects of an enterprise entity.

BACKGROUND

Emails and meeting activities between a project development team and a client of a project are mostly obscure and blind spots for a team manager. This makes it impossible for the team manager to know the exact state of the project and whether project development team needs any help in making progress on the project.

Currently, people try to solve this problem by asking individual team members whether they have been communicating with each other and whether they are having any meetings with other team members or the client. Such an approach is time consuming and often ineffective and inaccurate.

BRIEF DESCRIPTION OF THE DRAWINGS

Embodiments of the invention are illustrated by way of example and not limited to the figures of the accompanying drawings in which like references indicate similar elements.

DETAILED DESCRIPTION

Figure 1A:
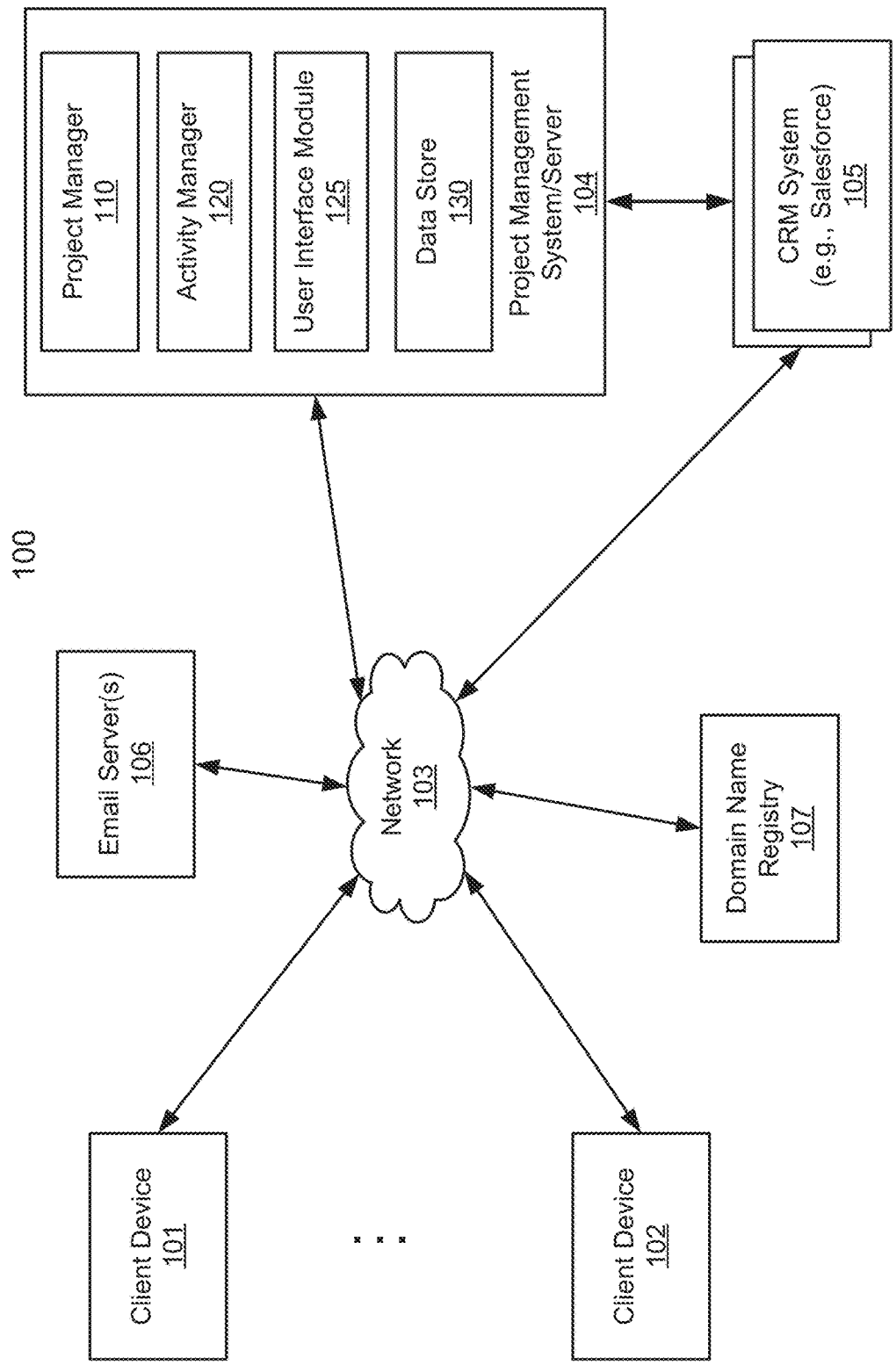
FIGS. 1A and 1B are block diagrams illustrating a network configuration according to certain embodiments of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, a system for identifying activities of a project associated with a client communicates with a customer relationship management (CRM) system to determine target email addresses of the client, e.g., a prospect or customer. The system also determines source email addresses of team members of a project development team associated with the project that are involved in the project from the CRM system. For the source email addresses and target email addresses, the system automatically queries an email server to determine email and meeting activities associated with the project. The system automatically populates these activities accurately without time consuming meetings as soon as meetings have been scheduled and/or emails have been exchanged. Embodiments of the invention help the project management by providing team managers accurate state of the projects without time consuming phone calls/meetings with project development teams. The system enables one to determine activities of project development teams for projects in real time without manual data processing. Throughout this application, emails and calendar events (e.g., meetings) have been utilized as examples of project activities. However, it is not so limited, other types of activities associated with the projects may also be applicable.

According to one aspect of the invention, a CRM system is queried to obtain a project that is associated with an entity (e.g., a user, a group of users, a client). A first list of one or more contacts (e.g., contact persons, referred to herein target contacts) associated with the project from the CRM system. For each of the contacts in the first list, a domain name is determined based on contact information of the contacts (e.g., emails, Web addresses, name of an account associated with the contacts). A first set of email addresses, referred to as target email addresses, is determined based on the domain name and contacts using a set of email identification rules. An email server is queried to retrieve a list of one or more emails and/or calendar events based on the first set of email addresses.

In one embodiment, in determining a domain name, it is determined from the CRM whether there is any project contacts associated with the project. If there is a project contact associated with the project, the domain name is determined based on the project contact of the project. A project contact refers to a person of a client (e.g., an employee of a corporate client) who specifically handles a particular project. The domain name may be obtained from an email address of the project contact. If there is no project contact associated with the project, the domain name may be determined based on an account contact associated with an account to which the project belongs. An account may represent a client (e.g., an Enterprise entity) or a division of a client, which may include one or more projects. An account contact refers to a person who is associated with all projects of a particular account. The domain name may be obtained from an email address or name of the account contact.

According to another embodiment, if there is no account contact associated with the account of the project, the domain name may be determined based on a Web address of a Web site associated with the account. The Web address may also be obtained from the CRM system as a part of account contact information of the account associated with the project. If there is no Web address obtained from the CRM system, the domain name may be obtained from a domain name registry based on an account name of the account. Typically, if the account has been registered in the domain name registry, the registered domain name is typically registered under a particular name. Based on the account name, a registered domain name may be obtained from the domain name registry, where the domain name registry may be hosted by a third party. If there is no registered domain name based on the account name, a name-to-domain (name/domain) mapping table is utilized to obtain the domain name based on the account name. The name/domain mapping table includes a number of mapping entries, where each mapping entry maps a particular name to a domain name. Such a name/domain mapping table may be maintained and updated periodically to map a name to a domain name, especially when the name is not related to the domain name from its appearance.

According to another embodiment, in addition to obtaining the first set of email address as target email addresses, a second list of one or more contacts associated with the project is identified from the CRM system. The second list of contacts, referred to herein as source contacts, is associated with one or more team members of a project development team that is working with the target contacts on the project. A second set of email addresses associated with the contacts of the second list is determined, where the email addresses of the second list are referred to as source email addresses. The email server is queried based on the source email addresses and the target email addresses to obtain a list emails and/or calendar events. That is, only the emails or meetings exchanged between the source email addresses and the target email addresses (e.g., senders and recipients) are identified as they are related to the same project.

According to another aspect of the invention, a list of one or more projects is displayed on a first display area of a display, where the projects were obtained from a CRM system over a network. A first user input is received from a user selecting a first of the displayed projects. In response to the first user input, the CRM system is queried to determine a set of email addresses associated with the first project. An email server is accessed based on the first set of email addresses to obtain a list emails that have been exchanged and/or calendar events that have been scheduled. One or more graphical representations (e.g., icons) are displayed in a second display area. The graphical representations represent the list emails and/or calendar events. The graphical representations are displayed in a calendar view based on timing of the emails and/or calendar events, which represent the activities of the project. Each of the graphical representations further includes a number indicating a number of emails and/or events occurred at that particular point in time.

When a second user input is received selecting one of the graphical representations, the email server is queried to obtain information concerning one or more emails and/or events represented by the selected graphical representation. A brief description is displayed in a third display area summarizing the emails and/or events associated with the first graphical representation. A user can simply move a cursor within a predetermined proximity of or over a graphical representation for selecting the graphical representation. Such a cursor action is detected and a brief summary of the emails and/or events is then displayed, for example, in a pop-up window.

FIG. 1A is a block diagram illustrating a network configuration according to one embodiment of the invention. Referring to FIG. 1A, system 100 includes, but is not limited to, one or more client systems 101-102 communicatively coupled to servers 104-105 over network 103. Clients 101-102 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Network 103 may be any type of networks such as a local area network (LAN), a wide area network (WAN) such as the Internet, or a combination thereof, wired or wireless. Servers 104-105 can be any kinds of servers or a cluster of servers, such as, for example, Web servers, application servers, cloud servers, backend servers, etc.

CRM system/server 105 provides CRM services to a variety of clients, which may be periodically or constantly accessed and updated by the clients for managing their CRM data or other project management data. CRM data includes any kinds of customer relationship management data, such as, for example, projects, tasks, deals, contracts, etc. The CRM services may be provided by a variety of CRM vendors, such as, for example Salesforce.com, SAP AG, Oracle, and Microsoft. CRM is a term that refers to practices, strategies and technologies that companies use to manage and analyze customer interactions and data throughout the customer lifecycle, with the goal of improving business relationships with customers, assisting in customer retention and driving sales growth. CRM systems are designed to compile information on customers across different channels or points of contact between the customer and the company, which could include the company's website, telephone, live chat, direct mail, marketing materials and social media.

In one embodiment, project management system or sever 104 (also referred to as a data analytics system or server) provides project management and/or data analytics services to clients 101-102 based on CRM data provided by CRM system 105 as a data source. Note that although there is only one CRM system shown, multiple CRM systems may also be implemented, where project management system 104 may be implemented as a multi-tenancy system that can access multiple CRM systems concurrently over network 103. For example, a user of client device 101 may be associated with a first organization as a first corporate client to project management system 104, while a user of client device 102 may be associated with a second organization as a second corporate client to data analytics system 104. The first and second organizations may employ different ones of CRM systems 105. Similarly, a CRM system may also be a multi-tenancy CRM systems hosting CRM data for a number of clients or Enterprise entities. Also note that a CRM system is utilized as an example of data sources, however, other types of data sources or systems can also be applied.

In one embodiment, project management system 104 includes, but is not limited to, project manager 110, activity manager 120, user interface module 125, and data store 130. Project manager 110 is configured to interact with CRM system 105 to access and manage projects hosted by CRM system 105. Activity manager 120 is configured to determine any activities associated with a particular project such as emails and calendar events (e.g., meetings). The user interface module 125 provides a user interface, which can be any kind of user interface (e.g., Web, graphical user interface or GUI, or command line interface or CLI) that allows users of client devices 101-102 to access the services provided by project management system 104. In one embodiment, such a service may include automatically identifying activities associated with projects. The determined activities may be presented by user interface module 125 on a graphical user interface (GUI) at a client that accesses project management system 104. A project can be any kind of projects such as a sales project (also referred to as an opportunity).

Data store 130 stores or caches CRM data of a variety of projects, which may be periodically updated from the corresponding data source(s) or data provider(s), in this example, CRM system(s) 105. Alternatively, project manager 110 and/or activity manager 120 may directly access CRM system(s) 105 to query and retrieve the CRM data. Data stored in data store 130 can be maintained in a variety of data structures, such as tables or databases. Project manager 110 and/or activity manager 120 can access data store 130 via a variety of application programming interfaces (APIs), database queries, or other suitable communication protocols (e.g., structured query language or SQL).

According to one embodiment, activity manager 120 is configured to identify activities of a project associated with a client by invoking project manager 110, which communicates with CRM system 105 to determine target email addresses of the client, e.g., a prospect or customer. The activity manager 120 also determines source email addresses of team members of a project development team associated with the project that are involved in the project from CRM system 105. For the source email addresses and target email addresses, activity manager 120 automatically queries email server 106 to determine email and meeting activities associated with the project. The activity manager 120 automatically populates these activities accurately without time consuming meetings as soon as meetings have been scheduled and/or emails have been exchanged at email server 106. This helps the project management by providing team managers accurate state of the projects without time consuming phone calls/meetings with project development teams. This further enables one to determine activities of project development teams for projects in real time without manual data processing.

Figure 1B:
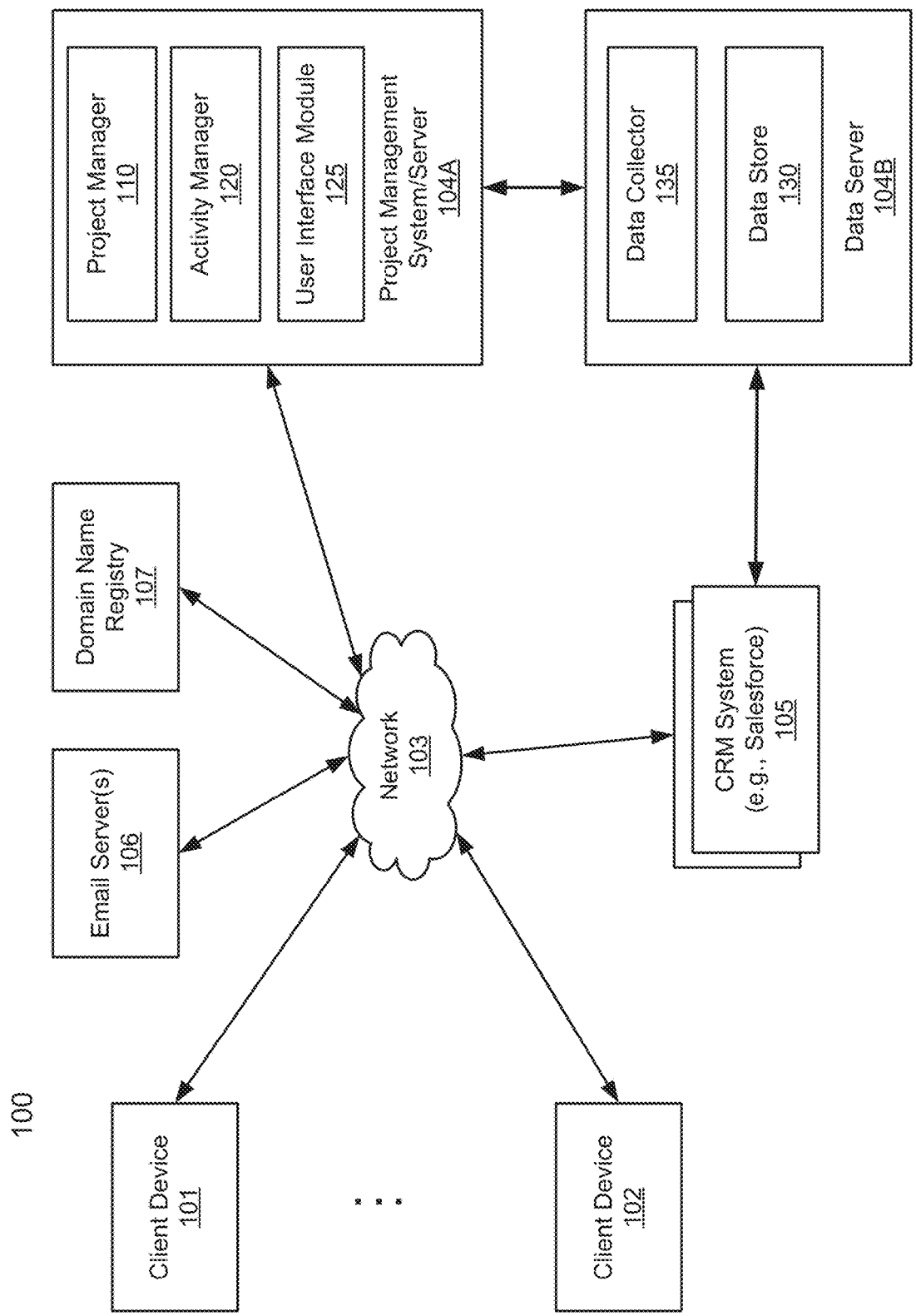

Although in this embodiment, data store 130 is maintained by project management system 104, however, data store 130 can be maintained in a dedicated data server that is a separate server from project management server 104 as shown in FIG. 1B. Referring now to FIG. 1B, in this embodiment, project management server 104A and data server 104B are implemented as separate servers, which may be operated by the same or different organizations or entities. Data store 130 is now maintained by data server 104B. Data server 104B further includes data collector 135 configured to periodically or constantly collect or update CRM data from data sources 105. Project management server 104A communicates with data server 104B using a variety of communication protocols to access task data stored in data store 130.

Figure 2:
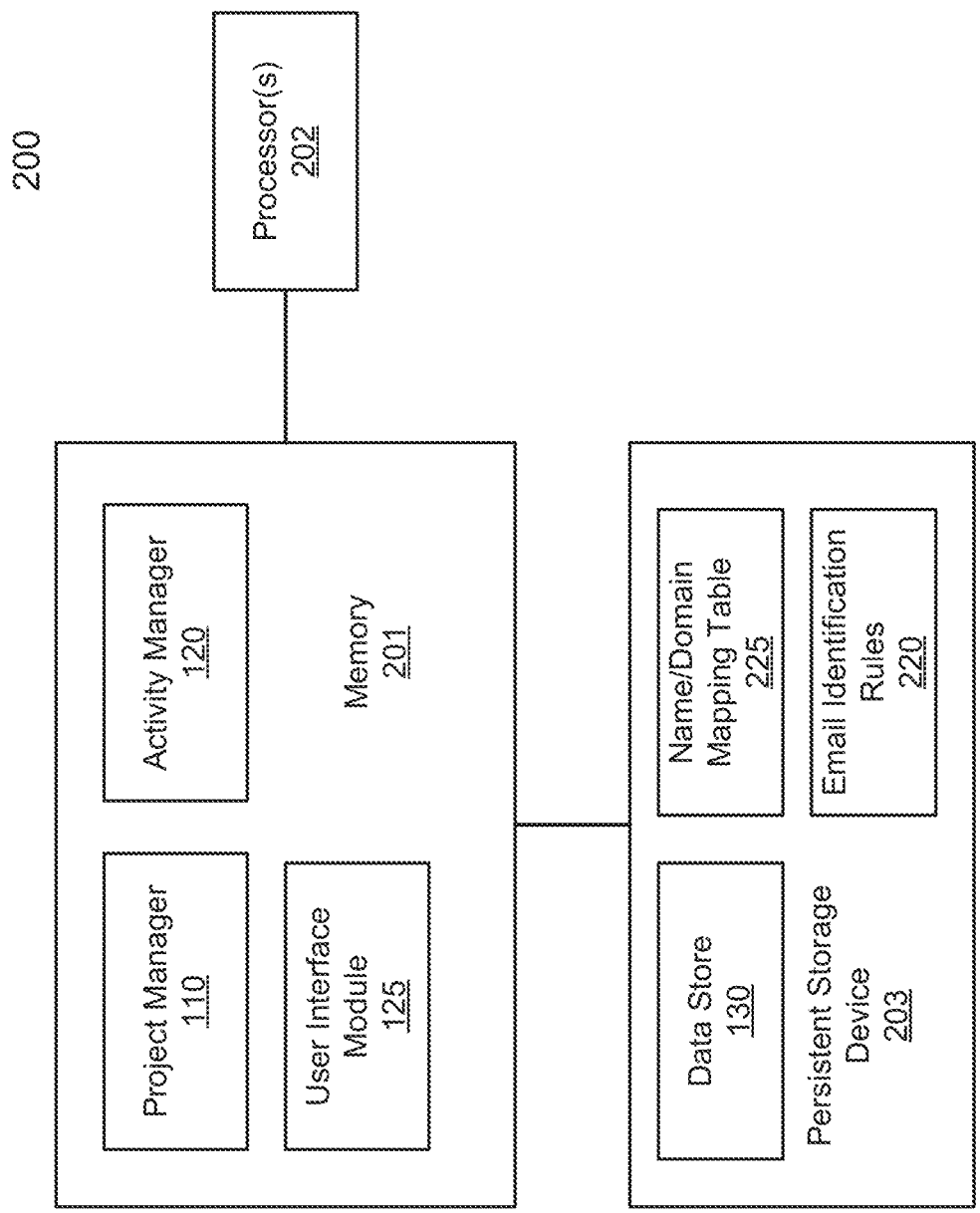
FIG. 2 is a block diagram illustrating an example of a project management system according to one embodiment of the invention.

FIG. 2 is a block diagram illustrating an example of a project management system according to one embodiment of the invention. System 200 may be implemented as part of project management system or server 104. Referring to FIG. 2, system 200 includes project manager 110, activity manager 120, and user interface module 125 loaded in memory 201 (e.g., volatile memory such as random access memory or RAM) and executed by one or more processors 202 (e.g., microprocessors, central processing units or CPUs). Data store 130 is maintained in persistent storage device 203, such as a hard disk, which may be maintained locally or remotely over a network. At least a portion of data stored in data store 130 may be cached in memory 201.

Referring now to FIGS. 1A-1B and 2, according to one aspect of the invention, project manager 110 queries CRM system 105 obtain a list of projects that are associated with a particular entity (e.g., a user, a group of users, a client or customer). CRM system 105 may be a CRM system associated with or utilized by an Enterprise client that a user is working with as a customer representative or sales representative, or as a team manager of a project development team. For example, a team manager of a sales team having one or more team members can log into project management system 200 and retrieve a list of projects that members of his or her team are working with. In response to the request, project manager 110 communicates with CRM system 105 to query for a list of the projects.

In one embodiment, when project manager 110 queries CRM system 105, it sends a query request to CRM system 105, where the query request includes certain parameters to specify one or more attributes of the projects to be queried. In response, CRM system 105 searches based on the query request to identify and retrieve the list of projects that satisfy the query request. For example, project manager 110 can query CRM system 105 by specifying that only the account contacts of a particular account should be retrieved or only the project contacts of a particular project should be retrieved, etc. Alternatively, project manager 110 may perform filtering of accounts and/or projects to identify the projects.

Figure 3:
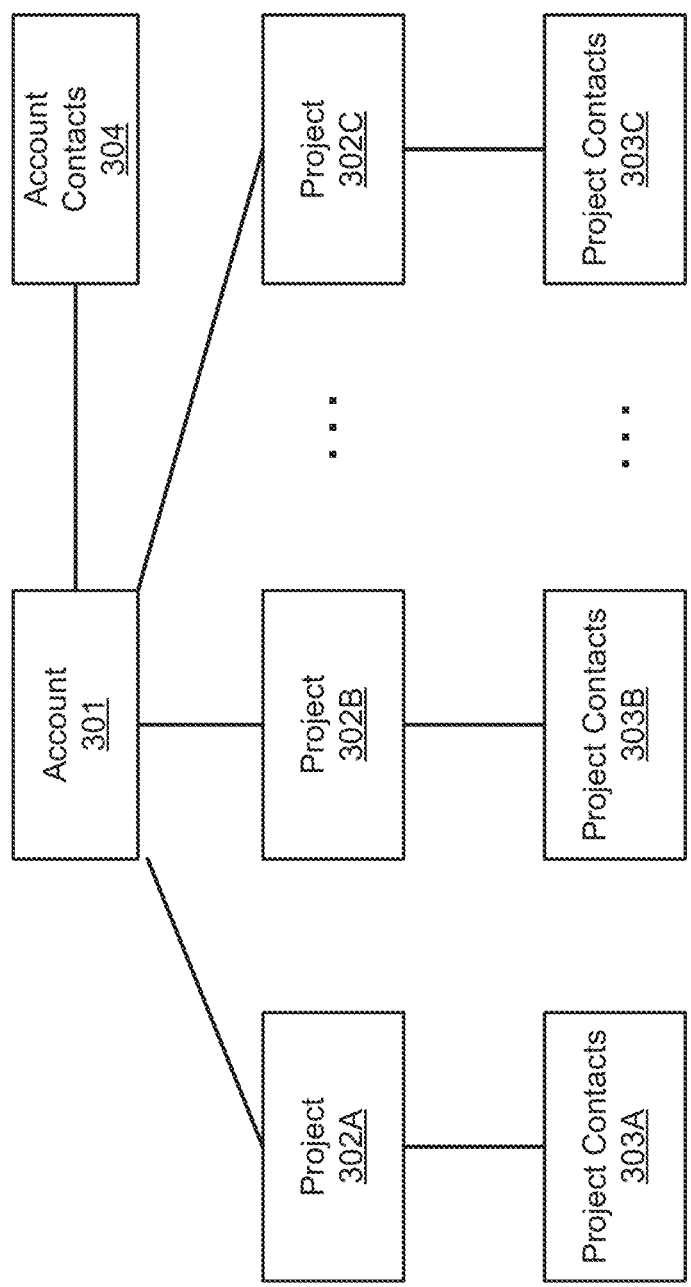
FIG. 3 is a block diagram illustrating an architecture of projects according to one embodiment of the invention.

A client or customer may be associated with an account maintained by CRM system 105. Each account may include one or more projects as shown in FIG. 3. Referring to FIG. 3, account 301 may be associated with one or more projects 302A-302C. For example, account 301 may belong to a client or customer that have potential projects 302A-302C concurrently being processed. Account 301 may be managed by one or more persons at an account level, referred to as account contacts 304. Each of projects 302A-302C may be managed by one or more persons at a project level, referred to herein as project contacts, such as project contacts 303A-303C. Different people may be associated with account contacts 304 and project contacts 303A-303C. Alternatively, a single person can be a part of both account contacts 304 and any one or more of project contacts 303A-303C. Each of account contacts 304 and project contacts 303A-303C may include one or more email addresses of the contact (e.g., a source email address and/or a target email address) and/or a Web site associated with the account or project. These contact information may be stored in CRM system 105 and accessible via queries.

For each of the projects (e.g., projects 302A-302C of FIG. 3), referring back to FIGS. 1A-1B and 2, project manager 110 queries CRM system 105 to obtain a first list of one or more contacts associated with the project, which can be a target contact or a source contact. A target contact refers to a person of a client or customer as a point of contact for a particular project. A source contact refers to a person associated with a service provider or vendor that provide project development for a client (e.g., a member of a project development team). For each of the contacts in the first list, either being an account contact or a project contact, activity manager 120 determines a domain name based on contact information of the contacts (e.g., emails, Web addresses, name of an account associated with the contacts). A first set of email addresses, referred to as target email addresses, are determined based on the domain name and contacts using a set of email identification rules 220. A target email address refers to an email address associated with a target contact. An email server is queried to retrieve a list of one or more emails and/or calendar events based on the first set of email addresses.

In one embodiment, if the contact information of a project includes the email addresses of the contacts, the email addresses may be directly used in identifying the activities. The domain name can be extracted from the email addresses, where the domain name can be used to identify other email addresses of the contacts. However, in some situation, the contact information stored in the CRM system may not include an email address of the contact. In such a scenario, the domain name has to be derived from other information (e.g., name, notes, Web address, phone number, social network such as Facebook®, Twitter®, LinkedIn®, etc.) associated with the contact.

The email identification rules 220 may specify a preference or priority order indicating which of the contact information should be used in order to identify a domain name. For example, email identification rules 220 may specify that project contact should be used to determine a domain name over the account contact, and the account contact will be used only if the project contact is unavailable, etc. Note that email identification rules 220 may be different for different clients, different accounts, and/or different projects. Email identification rules 220 may include a first set of rules for identifying source email addresses and a second set of rules for identifying target email addresses. Email identifying rules 220 may be configurable by an administrator via a configuration interface such as a CLI or Web interface.

In one embodiment, in determining a domain name associated with a client, an account, or a project, based on the data retrieved from the CRM by project manager 110 and dependent upon email identification rules 220, activity manager 120 determines whether there is any project contact associated with the project. If there is a project contact associated with the project, activity manager 120 determines the domain name based on the project contact of the project. A project contact refers to a person of a client who specifically handles a particular project. The domain name may be derived from any contact information (e.g., name, notes, Web address, phone number, social network such as Facebook®, Twitter®, LinkedIn®, etc.) associated with the project contact. If there is no project contact associated with the project, activity manager 120 determines the domain name based on an account contact associated with an account to which the project belongs. The domain name may be obtained from an email address or other information of the account contact. In this example, email identification rules 220 associated with this project may specify that a project contact should be utilized over an account contact in determining a domain name.

In one embodiment, an account may belong to a client (e.g., an Enterprise entity, a customer) or a division of a client. A client may have one or more accounts. An account may include one or more projects. A client may have one or more client contacts (e.g., contacts associated with the client). A project development team may have one or more team contacts. An account may have one or more account contacts (e.g., client contacts associated with the client and team contacts associated with an entity of project development team). A project may have one or more project contacts (e.g., client contacts associated with the project and team contacts associated with an entity of project development team). A client contact refers to a person or persons who are associated with all accounts of a client. An account contact refers to a person or persons who are associated with all projects associated with a particular account. A project contact refers to a person or persons who are associate with a particular project. The contact information concerning a client, an account, and/or a project may be stored in the CRM system and searchable and retrievable by specifying appropriate attributes. Similarly, on the project development side, there may be team contacts (e.g., source contacts) at the client level, account level, and project level corresponding to the client contacts at those levels.

According to another embodiment, if there is no account contact associated with the account of the project, dependent upon email identification rules 220, activity manager 120 may determine the domain name based on a Web address of a Web site associated with the account. The Web address may also be obtained from the CRM system as a part of account contact information of the account associated with the project.

According to one embodiment, if there is no Web address obtained from the CRM system, activity manager 120 determines the domain name from a domain name registry, such as domain name registry 107, based on an account name of the account. Typically, if the account has been registered in the domain name registry (e.g., WHOIS™), the registered domain name is typically registered under a particular name. Based on the account name, a registered domain name may be obtained from domain name registry 107.

If there is no registered domain name based on the account name, activity manager 120 utilizes a name-to-domain (name/domain) mapping table 225 to obtain the domain name based on the account name. In one embodiment, name/domain mapping table 225 includes a number of mapping entries, where each mapping entry maps a particular name to a domain name. Name/domain mapping table 225 may be maintained and updated over time to map a name to a domain name, especially when a name is not related to a domain name from its appearance. Name/domain mapping table 225 may be maintained by an organization associated with the project development team or by a third party.

The above process is to determine a domain name associated with a client (e.g., customer), an account, and/or a project. The domain name is then utilized to determine email addresses for the purpose of identifying activities of a project. Some of the above operations or the sequential order of the operations may be different dependent upon the specific situations, which may be specified as part of the email identification rules associated with the client, the account, and the project.

According to another embodiment, in addition to obtaining the first set of email address as target email addresses, activity manager 120 determines a second list of one or more contacts associated with the project via project manager 110 from the CRM system. The second list of contacts, referred to herein as source contacts, is associated with one or more team members of a project development team that are working with the target contacts on the project. A source contact can be an owner of the project, a solution engineer, a customer representative, and/or an account representative. A second set of email addresses associated with the contacts of the second list is determined by activity manager 120, where the email addresses of the second list are referred to as source email addresses. The email server, such as email server 106, is queried based on the source email addresses and the target email addresses to obtain a list emails and/or calendar events.

In one embodiment, only the emails or meetings that have been exchanged between the source email addresses and the target email addresses (e.g., senders and recipients) associated with the same project are identified. In some situations, a source contact may be handling multiple projects of different accounts and/or different clients. Similarly, a target contact may handle multiple projects of an account or multiple accounts. By matching the exact source email addresses and target email addresses, the truly relevant emails between the source contact(s) and target contact(s) of the same project may be identified.

In one embodiment, if some emails exchanged are prior to the creation of the project, such emails can be removed from the list because they are unlikely related to the project. Similarly, if certain calendar events were concluded or completed prior to the creation of the project, such calendar events may be removed. In addition, some of the contacts may be related to a broker or a product reseller or distributor, such contacts are not a part of the client or the project development team. Such contact information would not be utilized in determining the domain name for the purpose of identifying emails and calendar events of the project. In one embodiment, if a particular contact is associated with more than a predetermined number of accounts (e.g., five accounts), such a contact is deemed to be a broker or reseller/distributor and is deemed not to be a proper target contact. Similarly, if some of the projects have been closed, those projects will be removed and the activities of the closed projects would not be processed.

Figure 4:
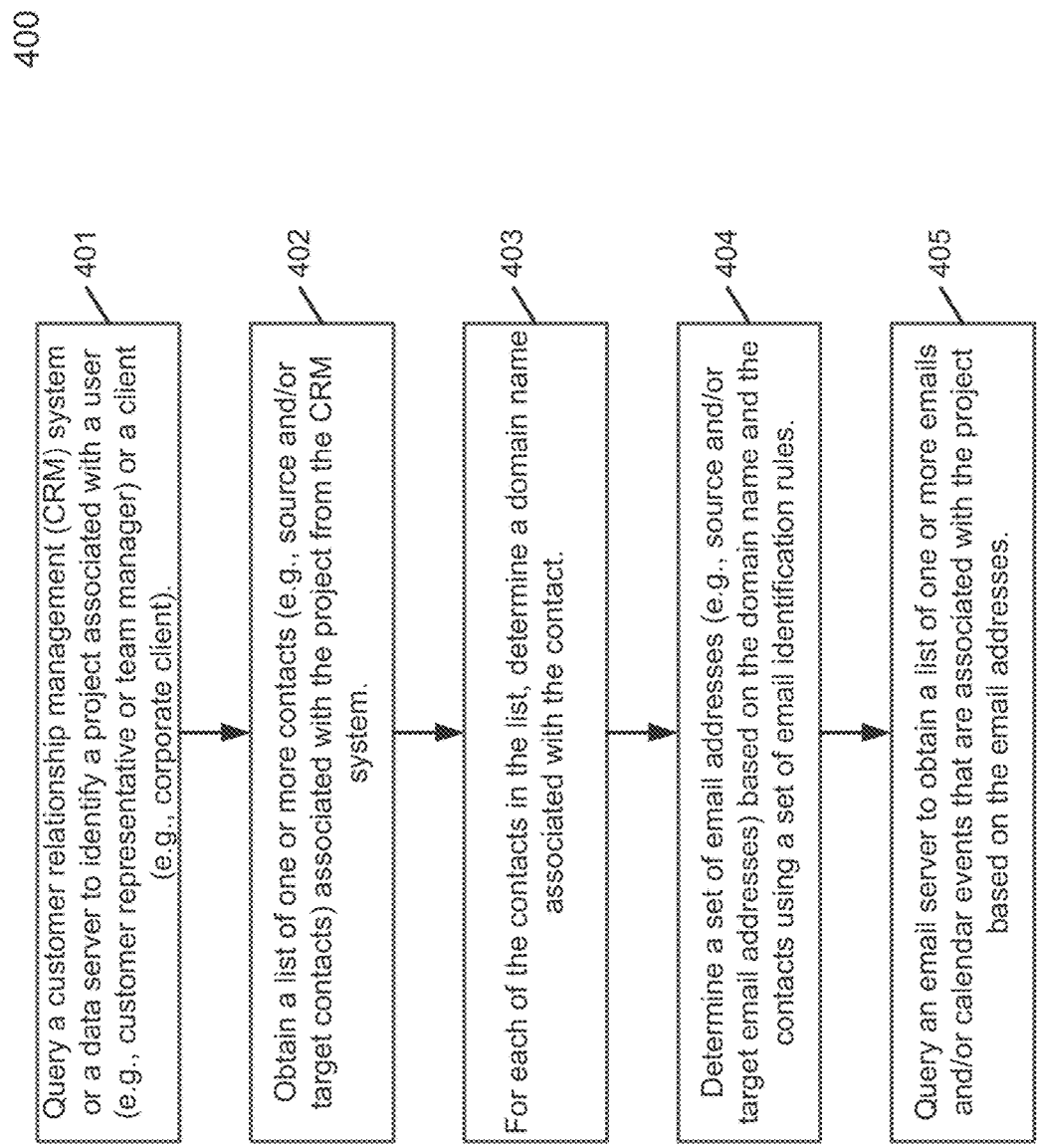
FIG. 4 is a flow diagram illustrating a process of identifying activities associated with projects according to one embodiment of the invention.

FIG. 4 is a flow diagram illustrating a process of identifying activities associated with projects according to one embodiment of the invention. Process 400 may be performed by processing logic which may include software, hardware, or a combination thereof. For example, process 400 may be performed by project manager 110 and/or activity manager 120. Referring to FIG. 4, in operation 401, processing logic queries a CRM system or a data server to identify a project associated with a user or an organization entity. The user may be an owner of the project, a team manager, a solution engineer, a customer representative, or an account representative from an organization of the project development (e.g., a source organization).

In operation 402, processing logic obtains a list of one or more contacts (e.g., email addresses, Web addresses, names) associated with the project from the CRM system. The contacts may include one or more source contacts and/or target contacts. For each of the contacts in the list, in operation 403 processing logic determines a domain name associated with the contact. In operation 404, processing logic determines a set of email addresses based on the domain name and the contacts using a set of email identification rules. Email addresses can be obtained by requesting the email server to obtain email addresses associated with a particular person's name under a particular domain name, etc. The email identification rules may specify a preference of email addresses (e.g., account contacts, project contacts) that should be utilized. In operation 405, processing logic queries an email server to obtain a list of one or more emails and/or calendar entries or events that are associated with the contacts based on the domain name.

Figure 5:
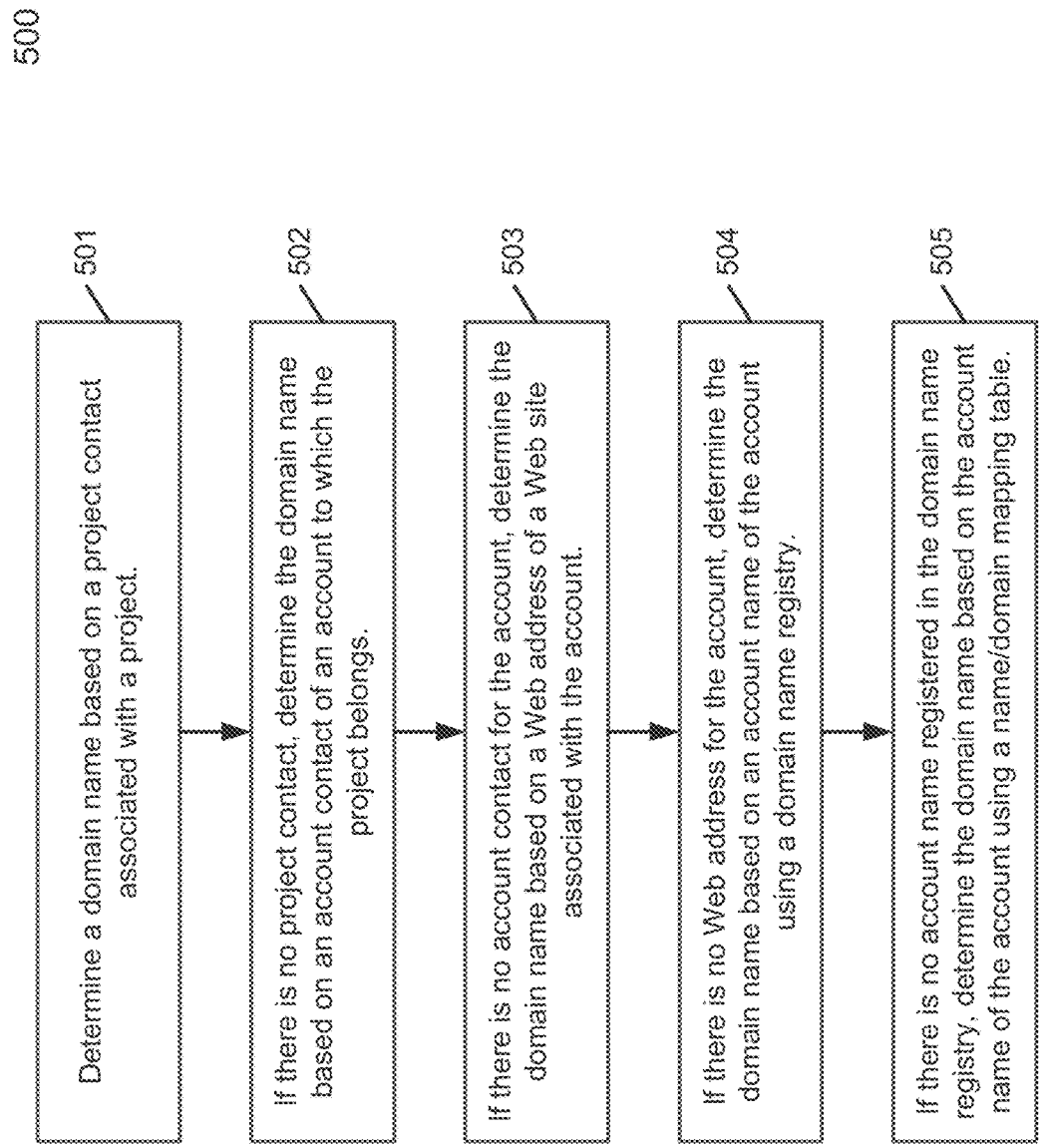
FIG. 5 is a flow diagram illustrating a process of identifying activities associated with projects according to another embodiment of the invention.

FIG. 5 is a flow diagram illustrating a process of identifying activities associated with projects according to another embodiment of the invention. Process 500 may be performed by processing logic which may include software, hardware, or a combination thereof. For example, process 500 may be performed by project manager 110 and/or activity manager 120 as a part of operations involved in operation 403 of FIG. 4. Referring to FIG. 5, in operation 501, processing logic determines a domain name based on a project contact of a project. A project contact refers to contact information of a client or customer associated with the project. If the project does not have project contact or domain name information, in operation 502, processing logic determines the domain name based on an account contact of an account to which the project belongs. An account contact refers to contact information of a client or customer associated with an account that includes the project.

If there is no account contact for the project, in operation 503, processing logic determines the domain name based on a Web address of a Web site associated with the account. If there is no Web addresses associated with the account, in operation 504, processing logic determines the domain name based on an account name of the account using a domain name registry. If the account name has not been registered in the domain name registry, in operation 505, processing logic determines the domain name using a name/domain mapping table. The name/domain mapping table includes a number of mapping entries, each mapping entry mapping a particular name to a domain name.

Figure 6:
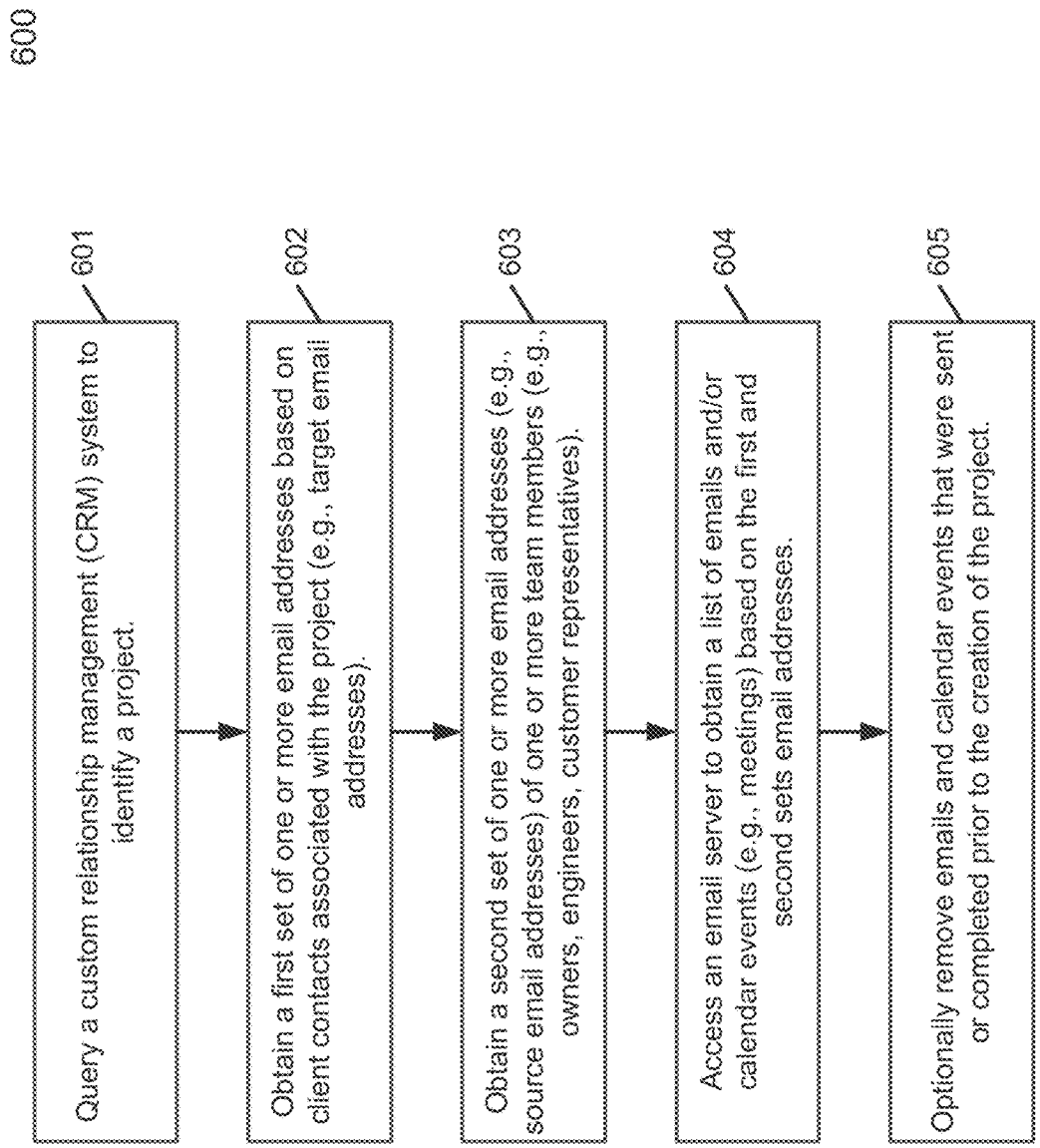
FIG. 6 is a flow diagram illustrating a process of identifying activities associated with projects according to another embodiment of the invention.

FIG. 6 is a flow diagram illustrating a process of identifying activities associated with projects according to another embodiment of the invention. Process 600 may be performed by processing logic which may include software, hardware, or a combination thereof. For example, process 600 may be performed by project manager 110 and/or activity manager 120. Referring to FIG. 6, in operation 601, processing logic queries a CRM system to identify a project. In operation 602, processing logic obtains a first set of one or more email addresses (e.g., target email addresses) based on client contacts associated with the project, for example, using at least some of the techniques described above. In operation 603, processing logic obtains a second set of one or more addresses (e.g., source email addresses) of one or more team members (e.g., owner, engineer, sales representative) associated the project. In operation 604, processing logic accesses an email server to obtain a list of emails and/or calendar events based on the first and second sets of email addresses. In operation 605, processing logic optionally removes emails and/or calendar events that were sent or concluded prior to creation of the projects.

Figure 7A:
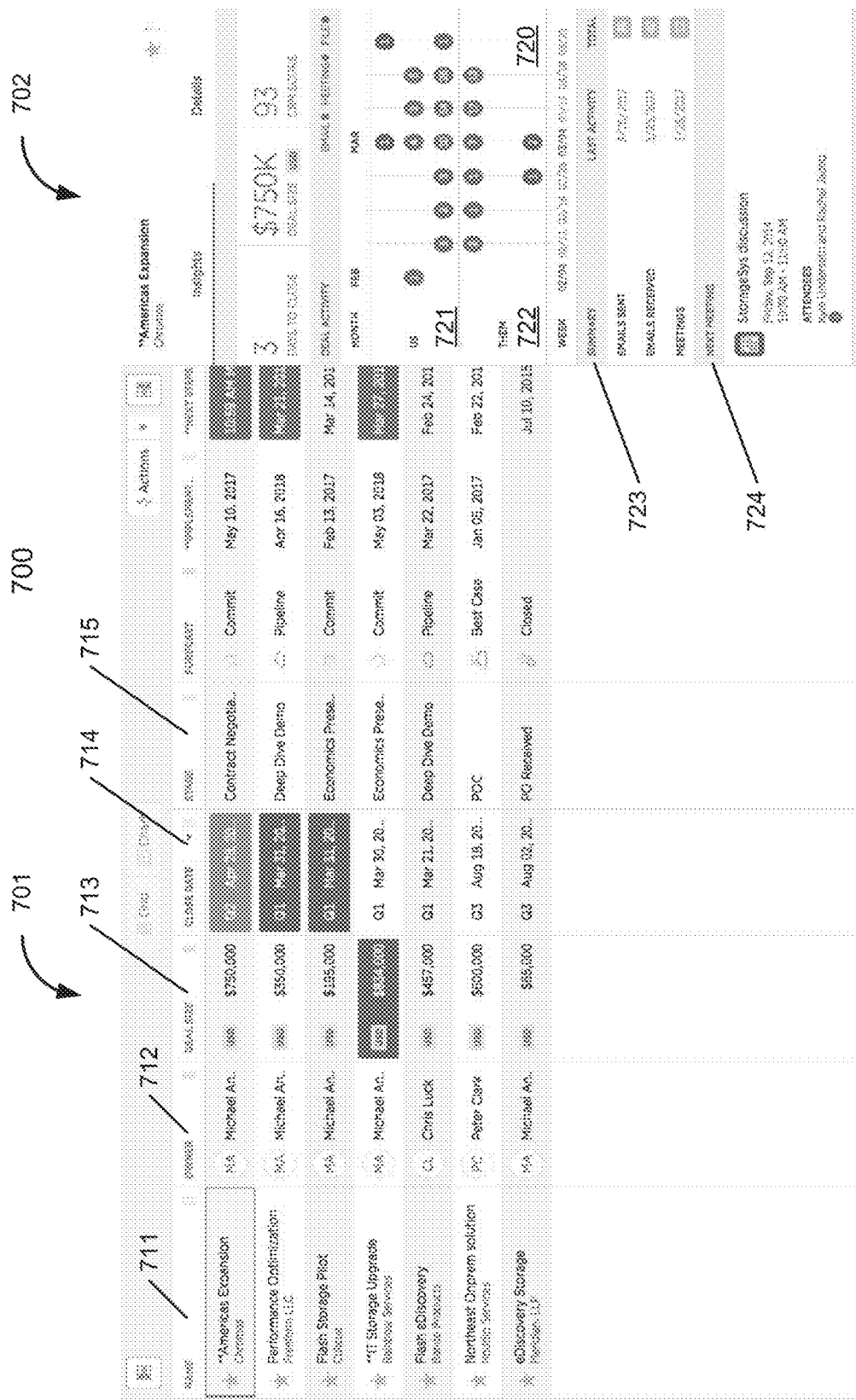
FIGS. 7A and 7B are screenshots illustrating an example of a graphical user interface for project management according to certain embodiments of the invention.
Figure 7B:

FIGS. 7A and 7B are screenshots illustrating an example of a graphical user interface for project management according to certain embodiments of the invention. GUI 700 may be rendered and presented by user interface module 125 of FIGS. 1A-1B. Referring to FIG. 7A, GUI 700 includes a first display area 701 to display a list of projects retrieved from a CRM system. For example, a user can obtain from the CRM system for projects associated with a particular client, a particular owner, a particular project stage, size of the projects, closing dates, etc. In this example, the list of projects is associated with a particular user, such as, for example, a manager of a project development team. In this example, the first display area 701 includes a number of entries. Each entry lists a particular project, including project name 711, owner name 712, size of project 713, closing date 714, and current project stage 715, etc.

When the user selects any one of the projects, in this example, "Americas Expansion," a list of emails and/or calendar events are identified using at least some of the activity identification techniques described above. Graphical representations, in this example, round dots, representing emails and/or calendar events are presented in a second display area 702. In this embodiment, the activities are presented in a calendar view or calendar grid 720 based on the timing of the activities. For example, if an email has been sent or received or a calendar event has been scheduled at a particular date, week, or month, a graphical representation representing that email or calendar event is then displayed in a calendar block corresponding to that particular date, week, or month. If there are multiple activities associated with a particular date, week, or month, the corresponding graphical representation further includes a number representing the number of activities.

In one embodiment, different colors and/or shapes of the graphical representations may represent different types of activities, such as, for example, emails, meetings, and files. In addition, the activities may be grouped into a first group 721 that is initiated by the project development team and a second group 722 initiated by the customer. In addition, a summary of the activities 723 is displayed within display area 702, for example, including a number of emails sent, a number of emails received, and/or a number of meetings scheduled. The summary further includes the date of the last activity of each category and a total number of the activities in each category. Next meetings 724 that have been scheduled are also displayed.

A user can select any of the graphical representation from display area 702 to display further information of the associated activity. For example, referring now to FIG. 7B, when a user moves a cursor within a predetermined proximity of a graphical representation or clicks on the graphical representation, a brief summary of the selected activity or activities is displayed in a third display area, in this example, as pop-up window 731.

Figure 8:
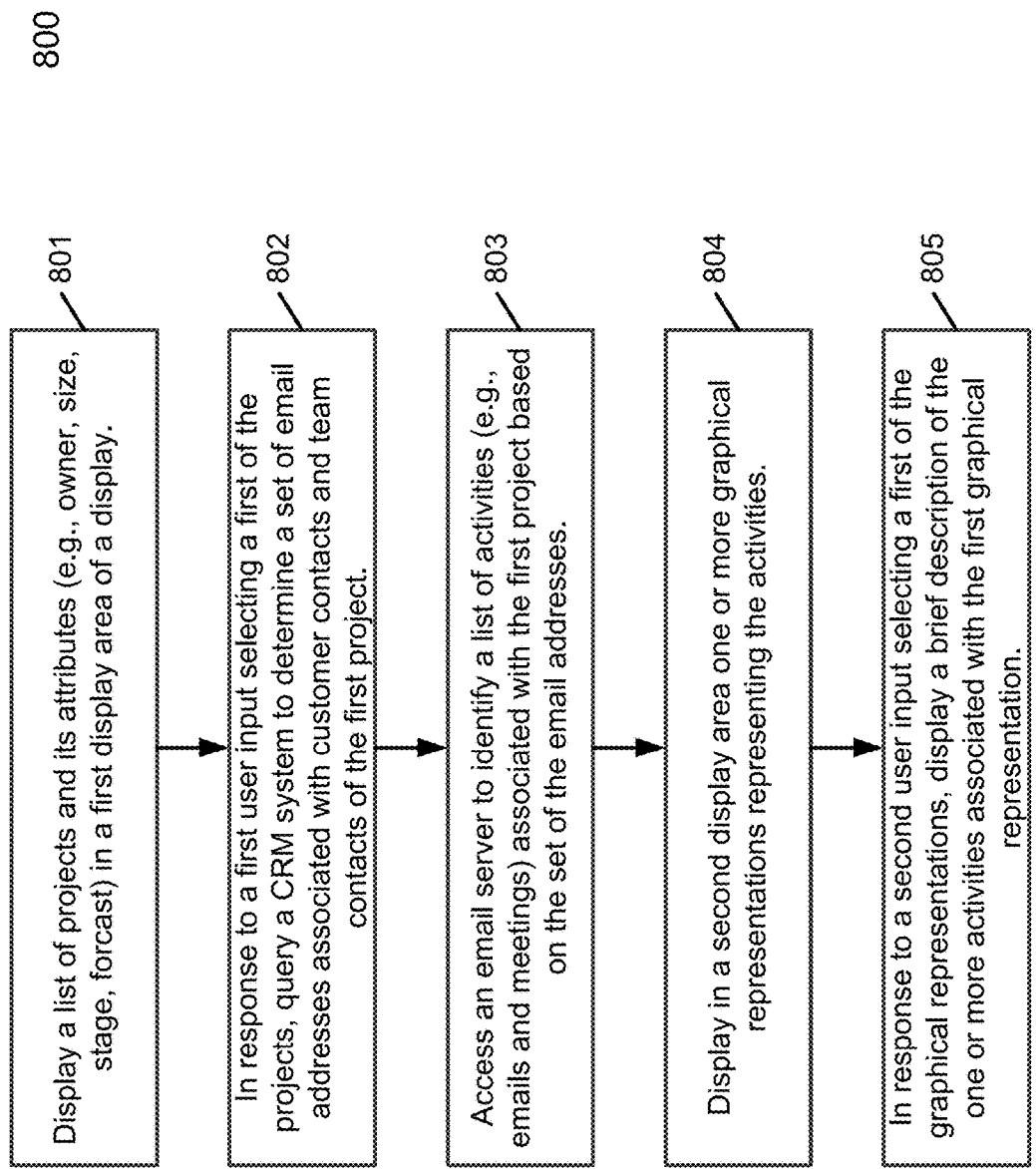
FIG. 8 is a flow diagram illustrating a process of identifying activities associated with projects according to another embodiment of the invention.

FIG. 8 is a flow diagram illustrating a process of identifying activities associated with projects according to another embodiment of the invention. Process 800 may be performed by processing logic which may include software, hardware, or a combination thereof. For example, process 800 may be performed by project manager 110, activity manager 120, and/or user interface module 125. Referring to FIG. 8, in operation 801, processing logic obtains a list of projects from a CRM system and displays the projects in a display area of a display. In response to a user input selecting a first of the projects, in operation 802, processing logic queries the CRM system to determine a set of email addresses associated with the first project. The email addresses may be associated with the target contacts and/or source contacts of the first project.

In operation 803, processing logic accesses an email server to identify and obtain a list of one or more activities (e.g., emails and/or calendar events) based on the email addresses. In operation 804, processing logic displays in a second display area one or more graphical representations representing the activities. The activities may be displayed in a calendar view within the second display area based on timing of the activities. In operation 805, in response to a second user input selecting a first of the graphical representations, processing logic displays a brief description of one or more activities represented by the first graphical representation.

Note that some or all of the components as shown and described above (e.g., project manager 110, activity manager 120, and user interface module 125 of FIGS. 1A-1B and 2) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 9:
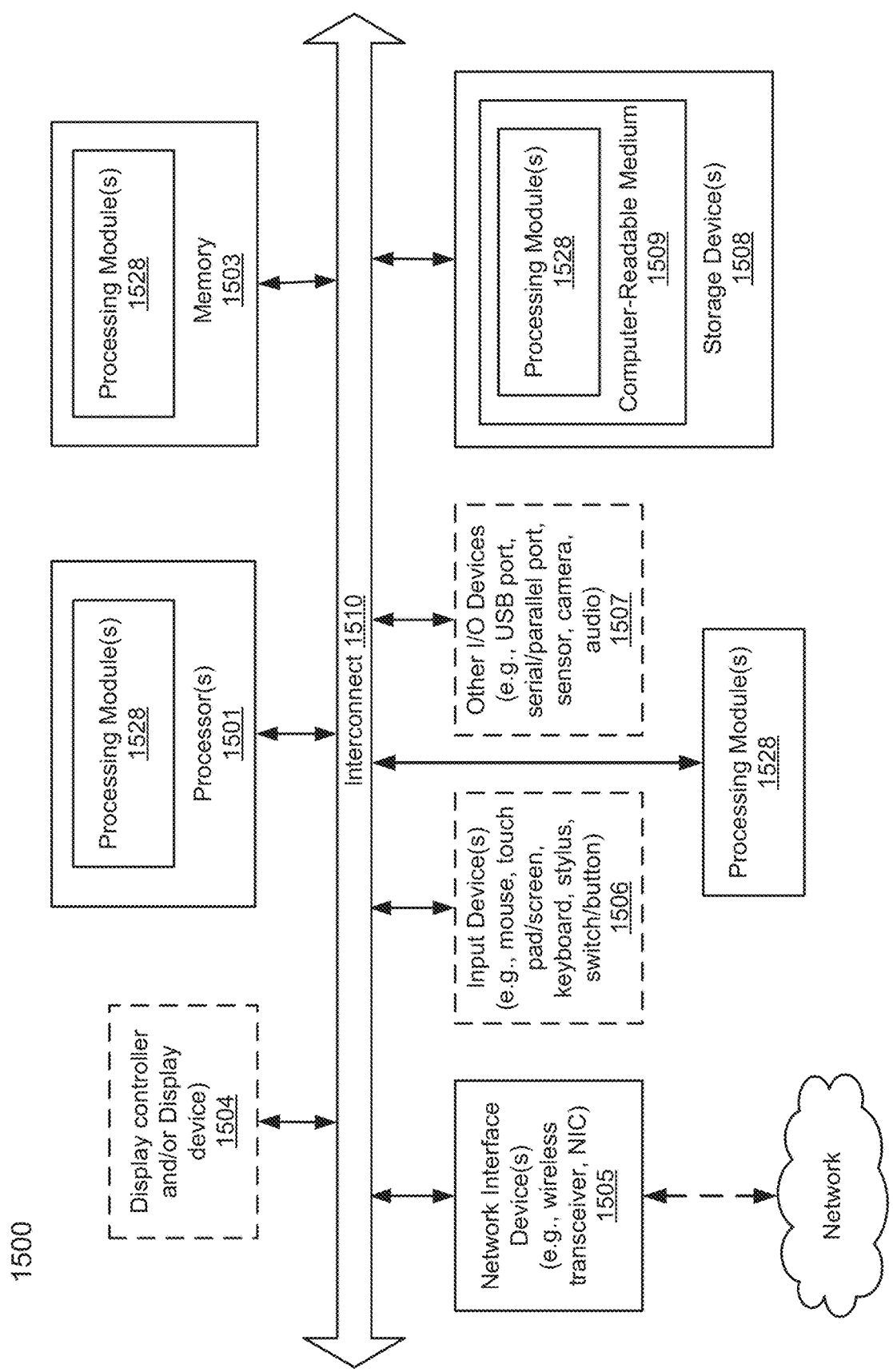
FIG. 9 is a block diagram illustrating a data processing system according to one embodiment.

FIG. 9 is a block diagram illustrating an example of a data processing system which may be used with one embodiment of the invention. For example, system 1500 may represent any of data processing systems described above performing any of the processes or methods described above, such as, for example, client devices 101-102 and servers 104-107 of FIGS. 1A and 1B. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a coprocessor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, project manager 110, activity manager 120, and/or user interface module 125. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for identifying activities associated with projects, the method comprising:
    automatically and periodically by a data analytics server,
        querying, via a first application programming interface (API), a customer relationship management (CRM) system to obtain project data of a plurality of projects associated with a plurality of entities, and
        storing the project data of the plurality of projects in a local data store associated with the data analytics server, wherein the project data includes one or more contacts associated with each of the plurality of projects;
    receiving, at the data analytics server from a client device over a network, a request for determining activities of a project associated with a first entity, wherein the request includes information that identifies the project of the first entity;
    in response to the request, obtaining a first list of one or more contacts associated with the project from the local data store, wherein the one or more contacts of the first list are associated with the first entity;
    for each of the contacts in the first list, determining a domain name associated with the contact based on a set of email identification rules, wherein the email identification rules specify an order of priority in which a plurality of levels of contact information are to be used to determine the domain name, wherein determining a domain name associated with the contact based on a set of email identification rules comprises:
        identifying an email address from the contact, and
        extracting the domain name from the email address of the contact;
    determining a first set of email addresses based on the domain name and the contacts, wherein the first set of email addresses is associated with the first entity;
    identifying from the local data store a second list of one or more contacts associated with the project, wherein the second list of one or more contacts is associated with a second entity, wherein the first entity and the second entity are different entities, and wherein the second entity provides services to the first entity;
    determining a second set of email addresses associated with the second list of contacts;
    determining an email server based on the domain name;
    querying, via a second API, the email server associated with the domain name to retrieve activity data, including one or more of an email message or a calendar event, wherein the activity data is associated with the first set of email addresses and the second set of email addresses, wherein retrieving the activity data from the email server includes:
        identifying email messages exchanged between any of the email addresses in the first set and any of the email addresses in the second set, and
        identifying calendar events scheduled between any of the email addresses in the first set and any of the email addresses in the second set; and
    transmitting an activity summary describing the activity data to the client device over the network, wherein the activity summary includes a first value representing a number of the identified email messages and a second value representing a number of the identified calendar events occurred at different points in time.

2. The method of claim 1, wherein determining a domain name associated with the contact comprises:

determining whether there is any project contact associated with the project based on the project data obtained from the local data store;
determining the domain name based on a project contact associated with the project based on the project data obtained from the local data store, if there is a project contact associated with the project; and
determining the domain name based on an account contact associated with an account corresponding to the project, the account having one or more projects, in response to determining that there is no project contact associated with the project.

3. The method of claim 2, further comprising:
determining whether there is any account contact associated with the account; and
determining the domain name based on a Web address of a Web site associated with the account obtained from the CRM system, in response to determining that there is no account contact associated with the account.

4. The method of claim 3, further comprising:
determining whether there is any Web site associated with the account; and
determining the domain name via a domain name registry based on an account name, in response to determining that there is no Web site associated with the account.

5. The method of claim 4, further comprising:
determining whether there is any domain name of the account registered in the domain name registry; and
determining the domain name using a name-to-domain (name/domain) mapping table based on the account name, in response to determining that there is no domain name of the account registered.

6. The method of claim 5, wherein the name/domain mapping table includes a plurality of mapping entries, each mapping entry mapping a particular name to a domain name that has been registered.

7. The method of claim 1, wherein the first list of contacts is associated with a customer of the project and the second list of contacts is associated with one or more team members of a project development team.

8. The method of claim 1, further comprising:
identifying a subset of email addresses from the first set of email addresses that are associated with a number of accounts greater than a predetermined threshold; and
removing the subset of email addresses from the first set of the email addresses prior to querying the email server.

9. A non-transitory machine-readable medium having instructions stored therein, which when executed by a processor, cause the processor to perform operations of identifying activities associated with projects, the operations comprising:
automatically and periodically,
querying, via a first application programming interface (API), a customer relationship management (CRM) system to obtain project data of a plurality of projects associated with a plurality of entities, and
storing the project data of the plurality of projects in a local data store associated with the data analytics server, wherein the project data includes one or more contacts associated with each of the plurality of projects;
receiving, at the data analytics server from a client device over a network, a request for determining activities of a project associated with a first entity, wherein the request includes information that identifies the project of the first entity;
in response to the request, obtaining a first list of one or more contacts associated with the project from the local data store, wherein the one or more contacts of the first list are associated with the first entity;
for each of the contacts in the first list, determining a domain name associated with the contact based on a set of email identification rules, wherein the email identification rules specify an order of priority in which a plurality of levels of contact information are to be used to determine the domain name, wherein determining a domain name associated with the contact based on a set of email identification rules comprises:
identifying an email address from the contact, and
extracting the domain name from the email address of the contact;
determining a first set of email addresses based on the domain name and the contacts, wherein the first set of email addresses is associated with the first entity;
identifying from the local data store a second list of one or more contacts associated with the project, wherein the second list of one or more contacts is associated with a second entity, wherein the first entity and the second entity are different entities, and wherein the second entity provides services to the first entity;
determining a second set of email addresses associated with the second list of contacts;
determining an email server based on the domain name;
querying, via a second API, the email server associated with the domain name to retrieve activity data, including one or more of an email message or a calendar event, wherein the activity data is associated with the first set of email addresses and the second set of email addresses, wherein retrieving the activity data from the email server includes:
identifying email messages exchanged between any of the email addresses in the first set and any of the email addresses in the second set, and
identifying calendar events scheduled between any of the email addresses in the first set and any of the email addresses in the second set; and
transmitting an activity summary describing the activity data to the client device over the network, wherein the activity summary includes a first value representing a number of the identified email messages and a second value representing a number of the identified calendar events occurred at different points in time.

10. The machine-readable medium of claim 9, wherein determining a domain name associated with the contact comprises:
determining whether there is any project contact associated with the project based on the project data obtained from the local data store;
determining the domain name based on a project contact associated with the project based on the project data obtained from the local data store, if there is a project contact associated with the project; and
determining the domain name based on an account contact associated with an account corresponding to the project, the account having one or more projects, in response to determining that there is no project contact associated with the project.

11. The machine-readable medium of claim 10, wherein the operations further comprise:
determining whether there is any account contact associated with the account; and
determining the domain name based on a Web address of a Web site associated with the account obtained from the CRM system, in response to determining that there is no account contact associated with the account.

12. The machine-readable medium of claim 11, wherein the operations further comprise:
  determining whether there is any Web site associated with the account; and
  determining the domain name via a domain name registry based on an account name, in response to determining that there is no Web site associated with the account.

13. The machine-readable medium of claim 12, wherein the operations further comprise:
  determining whether there is any domain name of the account registered in the domain name registry; and
  determining the domain name using a name-to-domain (name/domain) mapping table based on the account name, in response to determining that there is no domain name of the account registered.

14. The machine-readable medium of claim 13, wherein the name/domain mapping table includes a plurality of mapping entries, each mapping entry mapping a particular name to a domain name that has been registered.

15. The machine-readable medium of claim 9, wherein the first list of contacts is associated with a customer of the project and the second list of contacts is associated with one or more team members of a project development team.

16. The machine-readable medium of claim 9, wherein the operations further comprise:
  identifying a subset of email addresses from the first set of email addresses that are associated with a number of accounts greater than a predetermined threshold; and
  removing the subset of email addresses from the first set of the email addresses prior to querying the email server.

17. A data processing system, comprising:
  a processor; and
  a memory coupled to the processor to store instructions therein for generating a warning message based on system load of an autonomous driving vehicle (ADV), which instructions when executed by the processor, cause the processor to perform operations of identifying activities associated with projects, the operations including
    automatically and periodically,
      querying, via a first application programming interface (API), a customer relationship management (CRM) system to obtain project data of a plurality of projects associated with a plurality of entities, and
      storing the project data of the plurality of projects in a local data store associated with the data analytics server, wherein the project data includes one or more contacts associated with each of the plurality of projects;
    receiving, at the data analytics server from a client device over a network, a request for determining activities of a project associated with a first entity, wherein the request includes information that identifies the project of the first entity;
    in response to the request, obtaining a first list of one or more contacts associated with the project from the local data store, wherein the one or more contacts of the first list are associated with the first entity;
    for each of the contacts in the first list, determining a domain name associated with the contact based on a set of email identification rules, wherein the email identification rules specify an order of priority in which a plurality of levels of contact information are to be used to determine the domain name, wherein determining a domain name associated with the contact based on a set of email identification rules comprises:
      identifying an email address from the contact, and extracting the domain name from the email address of the contact;
    determining a first set of email addresses based on the domain name and the contacts, wherein the first set of email addresses is associated with the first entity;
    identifying from the local data store a second list of one or more contacts associated with the project, wherein the second list of one or more contacts is associated with a second entity, wherein the first entity and the second entity are different entities, and wherein the second entity provides services to the first entity;
    determining a second set of email addresses associated with the second list of contacts;
    determining an email server based on the domain name;
    querying, via a second API, the email server associated with the domain name to retrieve activity data, including one or more of an email message or a calendar event, wherein the activity data is associated with the first set of email addresses and the second set of email addresses, wherein retrieving the activity data from the email server includes:
      identifying email messages exchanged between any of the email addresses in the first set and any of the email addresses in the second set, and
      identifying calendar events scheduled between any of the email addresses in the first set and any of the email addresses in the second set; and
    transmitting an activity summary describing the activity data to the client device over the network, wherein the activity summary includes a first value representing a number of the identified email messages and a second value representing a number of the identified calendar events occurred at different points in time.

18. The system of claim 17, wherein determining a domain name associated with the contact comprises:
  determining whether there is any project contact associated with the project based on the project data obtained from the local data store;
  determining the domain name based on a project contact associated with the project based on the project data obtained from the local data store, if there is a project contact associated with the project; and
  determining the domain name based on an account contact associated with an account corresponding to the project, the account having one or more projects, in response to determining that there is no project contact associated with the project.

19. The system of claim 18, wherein the operations further comprise:
  determining whether there is any account contact associated with the account; and
  determining the domain name based on a Web address of a Web site associated with the account obtained from the CRM system, in response to determining that there is no account contact associated with the account.

20. The system of claim 19, wherein the operations further comprise:
  determining whether there is any Web site associated with the account; and determining the domain name via a domain name registry based on an account name, in response to determining that there is no Web site associated with the account.

21. The system of claim 20, wherein the operations further comprise:
   determining whether there is any domain name of the account registered in the domain name registry; and
   determining the domain name using a name-to-domain (name/domain) mapping table based on the account name, in response to determining that there is no domain name of the account registered.

22. The system of claim 21, wherein the name/domain mapping table includes a plurality of mapping entries, each mapping entry mapping a particular name to a domain name that has been registered.

23. The system of claim 17, wherein the first list of contacts is associated with a customer of the project and the second list of contacts is associated with one or more team members of a project development team.

24. The system of claim 17, wherein the operations further comprise:
   identifying a subset of email addresses from the first set of email addresses that are associated with a number of accounts greater than a predetermined threshold; and
   removing the subset of email addresses from the first set of the email addresses prior to querying the email server.

* * * * *